(12) United States Patent
Lauer

(10) Patent No.: US 10,794,241 B2
(45) Date of Patent: Oct. 6, 2020

(54) REDUCED-WEIGHT VALUE SPRING COLLAR

(71) Applicant: Dr. Ing. h.c. F. Porsche Aktiengesellschaft, Stuttgart (DE)

(72) Inventor: Frederic Lauer, Oberriexingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/260,238

(22) Filed: Jan. 29, 2019

(65) Prior Publication Data

US 2019/0234252 A1   Aug. 1, 2019

(51) Int. Cl.
| F01L 3/10 | (2006.01) |
| F01L 1/46 | (2006.01) |
| F01L 1/053 | (2006.01) |
| B33Y 80/00 | (2015.01) |

(52) U.S. Cl.
CPC ............... F01L 3/10 (2013.01); F01L 1/462 (2013.01); B33Y 80/00 (2014.12); F01L 2001/0537 (2013.01); F01L 2101/00 (2013.01); F01L 2101/02 (2013.01); F01L 2103/00 (2013.01)

(58) Field of Classification Search
CPC ..... F01L 1/462; F01L 3/10; F01L 2001/0537; F01L 2101/00; F01L 2101/02; F01L 2103/00; B33Y 80/00
See application file for complete search history.

(56) References Cited

U.S. PATENT DOCUMENTS

| 4,665,869 A | 5/1987 | Hinz et al. | |
| 5,213,072 A * | 5/1993 | Dohring | F01L 1/143 |
| | | | 123/90.37 |
| 5,322,039 A * | 6/1994 | Kinsey | F01L 3/10 |
| | | | 123/188.13 |
| 2014/0360447 A1 | 12/2014 | Kroos et al. | |

FOREIGN PATENT DOCUMENTS

| AT | 005 131 U1 | 3/2002 |
| DE | 43 01 608 | 7/1994 |
| DE | 10 2013 210 900 | 12/2014 |
| DE | 10 2016 014 769 | 6/2018 |
| JP | 10-317926 | 12/1998 |
| JP | 2000-161029 | 6/2000 |
| KR | 10-2008-0015224 | 2/2008 |

OTHER PUBLICATIONS

German Search Report dated Oct. 2, 2018.

* cited by examiner

*Primary Examiner* — Zelalem Eshete
(74) *Attorney, Agent, or Firm* — Gerald E. Hespos; Michael J. Porco; Matthew T. Hespos

(57) ABSTRACT

A valve spring collar (10) for supporting spring forces of closing springs (40) that act on gas exchange valves (32) in an internal combustion engine has a plate-shaped main body (12). A through opening (14) leads through the main body (12) for receiving and attaching a valve stem (36) of the gas exchange valve (32). The valve spring collar (10) also has at least one cavity (16). A method for producing the valve spring collar (10) includes at least one additive production method step.

19 Claims, 2 Drawing Sheets

REDUCED-WEIGHT VALUE SPRING COLLAR

CROSS REFERENCE TO RELATED APPLICATION

This application claims priority under 35 USC 119 to German Patent Appl. No. 10 2018 101 900.9 filed on Jan. 29, 2018, the entire disclosure of which is incorporated herein by reference.

BACKGROUND

Field of the Invention

The invention relates to a valve spring collar for supporting spring forces of closing springs that act on gas exchange valves in a valve actuation means of internal combustion engines and also to a method for producing such a valve spring collar. The invention additionally relates to a valve actuation means for an internal combustion engine having the above-described valve spring collar. The invention also relates to an internal combustion engine for a motor vehicle having at least one valve actuation means.

Related Art

Combustion of fuel in an internal combustion engines takes place in a cylinder space. The cylinder space is filled with fresh air and optionally fuel via gas exchange valves. Moreover, combustion gases are expelled from the cylinder space via the gas exchange valves. To this end, the gas exchange valves have a valve head that can close an opening of the cylinder space.

The actuation of the gas exchange valves takes place via a camshaft, the cams of which exert a force on a valve stem of the gas exchange valve counter to a closing spring to open the opening of the cylinder space. The closing spring subsequently moves the gas exchange valve into its closed position, in which the valve head closes the opening. The closing spring usually is configured as a helical spring that at least partially surrounds the valve stem.

A powerful internal combustion engine requires the gas exchange valves to be moved in a highly dynamic manner. Depending on the type of the internal combustion engine, engine rotational speeds of at least 10,000 revolutions per minute are possible. In some applications, rotational speeds of more than 20,000 revolutions per minute are possible. In the case of customary four stroke engines, each gas exchange valve is actuated up to 10,000 times per minute here.

The gas exchange valve therefore is moved in the internal combustion engine in a highly dynamic manner. A mass of the gas exchange valve is particularly important to achieve the desired movement of the gas exchange valve. Engine dynamics of the internal combustion engine can be higher when the mass of the gas exchange valve is lower. Moreover, a high maximum engine rotational speed can be achieved in the case of low masses.

An upper end of the valve stem of the gas exchange valve is coupled to a valve spring collar, via which the force of the closing spring is transmitted to the gas exchange valve and vice versa. The valve spring collar can be fixed on the valve stem by two clamping cone halves. The valve spring collar supplies a bearing face for the closing spring. Accordingly, the valve spring collar moves with the gas exchange valve in the case of an actuation by the camshaft.

DE 43 01 608 A1 relates to an apparatus for receiving at least one valve spring with a cone that is supported on a valve stem and a plastic plate that is supported on the cone and receives the valve spring. The cone has a stop collar that supports the plate such that the forces that act on the plate wall do not exceed a maximum value and a risk of fracture of the plate is avoided.

JP 103 17926 A1 discloses a valve spring collar for supporting the spring forces of closing springs that act on gas exchange valves in the valve actuation means of internal combustion engines. The valve spring collars comprise a reinforcing part made from a less strong material and an annular supporting part made from high strength material. The annular supporting part is arranged between the reinforcing part and the closing spring. For simplification during production and preassembly, the supporting part is held on the reinforcing part merely in a frictionally locking manner.

JP 2000 161 029 A1 discloses a spring retainer produced from an iron-based material to have improved strength and abrasion resistance, and the wall thickness and weight of the spring retainer are reduced. The spring retainer has a retaining body with a tapering supporting hole that is supported on the valve tappet side. A flange-like spring seat section is an outer circumferential section; and a side of the retaining body that makes it possible that a valve spring is in contact with the spring seat section is supported by the latter. The holding body and the spring seat section are configured in one piece from spring steel, and metal flow lines continue from the holding body to the spring seat section.

KR 2008 001 52 24 A relates to a production method for a valve spring retainer for a motor vehicle. The production method comprises the following steps: carrying out of a stamping operation to subject a valve spring retaining workpiece with an aluminum alloy (AL7075) composition to cold forging; carrying out of a soft annealing process at a temperature of from 410 to 450° C. for from 2 to 4 hours to carry out a cold forging process of the stamped workpiece after carrying out the stamping process; cold forging of the soft annealed workpiece using a press to obtain a workpiece with a desired shape, and subjecting of the workpiece to a T6 heat treatment process to increase the mechanical properties of the workpiece; and carrying out of a process of the deposition of a DLC (Diamond-Like Carbon) layer on the Cr layer after the production of a cage by way of the cold forging process and the T6 heat treatment process, and depositing of a Cr layer on a surface of the cage, around the surface of the holder.

U.S. Pat. No. 4,665,869 discloses an adaptation of a fiber orientation of a valve spring collar made from carbon fiber reinforced plastic to loads that occur during operation. Carbon fiber woven fabric layers that lie above one another are embedded into the valve spring collar in such a way that a conical opening runs perpendicularly through the woven fabric layers so that the warp and weft threads of the woven fabric layers are pushed to the outside out of the cross section of the opening and extend in each case over part of the circumference of the opening. The displaced warp and weft threads configure a greater thickness of the woven fabric layer in the edge region of the opening than in regions remote from the opening.

Proceeding from the abovementioned prior art, the invention is therefore based on the object of specifying a valve spring collar for supporting spring forces of closing springs that act on gas exchange valves in a valve actuation means of internal combustion engines, a valve actuation means for an internal combustion engine having a valve spring collar of this type, an internal combustion engine for a motor vehicle having at least one valve actuation means of this type, and a method for producing a valve spring collar of the abovementioned type, which make the provision of a light and stable valve spring collar possible for dynamic use in an internal combustion engine for providing a high performance valve actuation means.

SUMMARY

A valve spring collar for supporting spring forces of closing springs that act on gas exchange valves in a valve actuation means of internal combustion engines is provided. The valve spring collar has a plate-shaped main body. A through opening for leading through and attaching a valve stem of the gas exchange valve is in the main body. Additionally, the valve spring collar has at least one cavity.

The invention also relates to a valve actuation means for an internal combustion engine having the above-described valve spring collar.

Additionally, the invention relates to an internal combustion engine for a motor vehicle having at least one of the above-described valve actuation means.

Furthermore, a method for producing a valve spring collar is provided, where the method comprises an additive production method.

It is therefore a fundamental concept of the invention to reduce the weight of the valve spring collar by way of the configuration of the at least one cavity. As a result, the weight of the valve spring collar is reduced such that the moving masses of the valve actuation means are reduced, and the valve spring collar can be used with increased dynamics. The engine dynamics therefore are improved, and the engine rotational speed of the internal combustion engine can be increased. The reduced weight of the valve spring collar enables the use of restoring springs with lower forces.

The valve spring collar can be produced using an additive production method. The additive production method makes a configuration of the valve spring collar with a high degree of freedom during the production possible. The production of the valve spring collar can take place, for example, on the basis of a computer model so that a construction of the valve spring collar can be modified in a simple way.

Additive production methods comprise all methods for production from amorphous material, for example liquids, gels/pastes, powder or the like, or neutrally shaped material, for example strip material, wire-shaped material or sheet-shaped material, by means of chemical and/or physical processes, in the case of which the amorphous or neutrally shaped material is applied, in order to produce the desired component. No special molds are required for a specific result. Methods of this type are known, for example, in 3D printing.

The additive production methods make it possible to produce any desired components with the same mold. Special molds adapted to a shape of the workpiece to be produced, for example casting molds, are not required. Additive production methods comprise powder-pack methods, free space methods, liquid material methods and other layer building methods. A distinction of the different production methods is made, for example, depending on a material that is used, for example plastic, metal or ceramic. In principle, different additive methods can be combined during the production of one component.

Any desired structure can be produced by the additive production methods, and no rotational symmetry is required, as in the case of rotary machining.

The valve spring collar and the valve actuation means are used in the internal combustion engine to carry out a gas exchange in a combustion chamber or cylinder space of the internal combustion engine in a targeted manner. The valve actuation means enables an inlet of fresh air or an air/fuel mixture and also enables an outlet of combustion gases and/or residues from the combustion space.

The gas exchange valve is coupled at an upper end of its valve stem to the valve spring collar that transmits the force of the closing spring to the gas exchange valve and vice versa. For example, the valve spring collar can be fixed by two clamping cone halves on the valve stem. The valve spring collar supplies a bearing face for the closing spring. Accordingly, the valve spring collar moves with the gas exchange valve when actuated by the camshaft.

The at least one cavity may be rotationally symmetrical about a center axis of the valve spring collar. The rotationally symmetry and arrangement of the at least one cavity permits a partial use of conventional production methods, for example turning methods with machining or part machining of the cavity on its inner side, or machining or part machining of the through opening of the valve spring collar. Thus, the additive production can be combined simply with conventional machining methods.

The at least one cavity may be arranged annularly about a center axis of the valve spring collar and may be concentric with a center axis of the valve spring collar. The cavity can also comprise a plurality of individual ring segments.

At least one reinforcing element may extends through the cavity. The reinforcing element stabilizes the cavity and prevent sagging of the valve spring collar or the walls that surround the cavity. The at least one reinforcing element can be configured in different ways and can be arranged in the cavity.

The at least one reinforcing element may be a rib that extends in the radial direction through the cavity. The rib stabilizes the cavity possible and prevents sagging of the valve spring collar or the walls that surround the cavity. At least one rib can extend over the entire cross section of the cavity. As an alternative, the at least one rib can extend in a strut-like manner through the cavity.

The valve spring collar has at least one or more inlets, via which the cavity is connected to an outer side of the valve spring collar. Material can be removed from the cavity via the at least one inlet, which material is deposited there, for example, during the production of the valve spring collar. This can be material residues that have accrued during the additive processing of the valve spring collar, or else removes material in the case of subtractive processing of the valve spring collar.

The method may comprise an additional step for subtractive processing of the valve spring collar. As a result, for example, excess material in the case of the additive manufacturing of the valve spring collar can be removed. The subtractive processing can also comprise surface machining to provide a surface of the valve spring collar with desired properties. It can thus be desirable in the region of the through opening that it has a particularly planar surface to ensure an accurate fit of the valve stem therein. Subtractive processing is understood to mean all machining, by way of which material is removed from the valve spring collar. The subtractive processing can take place in an alternating manner with an additive processing, in order to achieve a desired configuration of the valve spring collar. Subtractive methods comprise, for example, material-removing methods or else other, non-material-removing methods, such as laser machining. A combination of additive and subtractive methods can take place, for example, by way of what are known as hybrid machines that combine, for example, laser deposit welding or a metal/powder deposit method with a milling method. One advantage of machining in a hybrid machine of this type is that the production of the valve spring collar can take place with a single clamping operation of the valve spring collar. As a result, tolerances that can occur as a result of renewed clamping of the valve spring collar during the production can be reduced.

In the following text, the invention will be described by way of example with reference to the appended drawings using exemplary embodiments, it being possible for the features described in the following text to represent an aspect of the invention both in each case individually and in combination.

DETAILED DESCRIPTION

Figure 1:
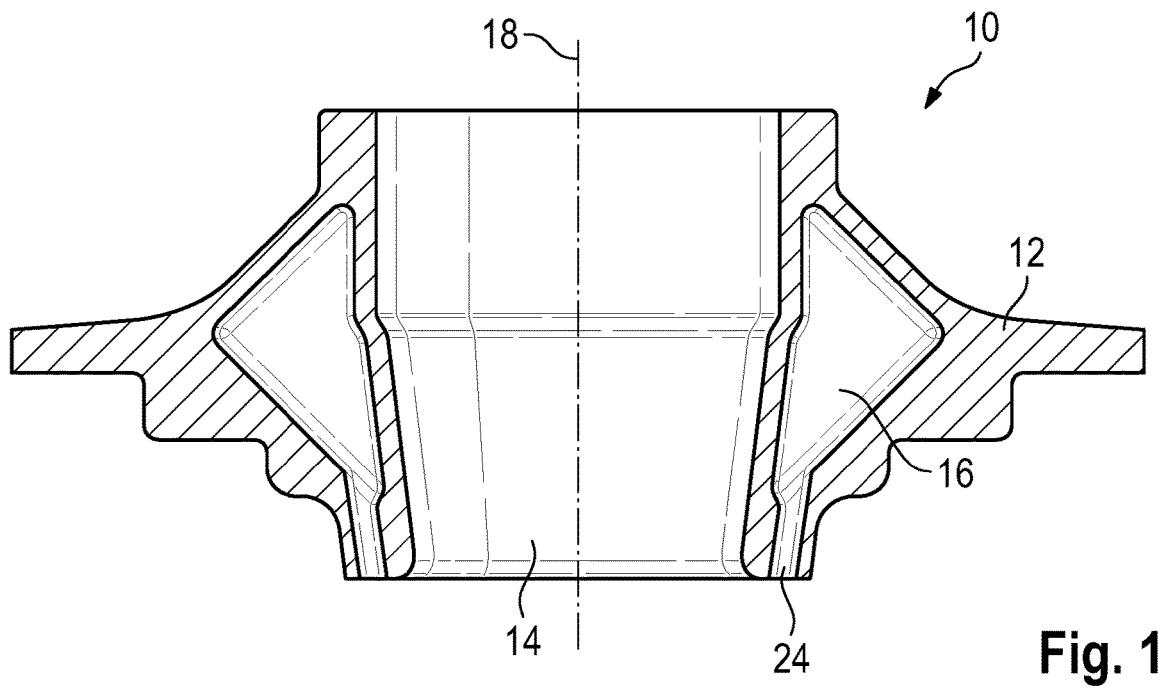
FIG. 1 is a lateral section of a region of a valve spring collar in accordance with a first embodiment having a main body and a through configured for leading through and attaching a valve stem of a gas exchange valve.
Figure 2:
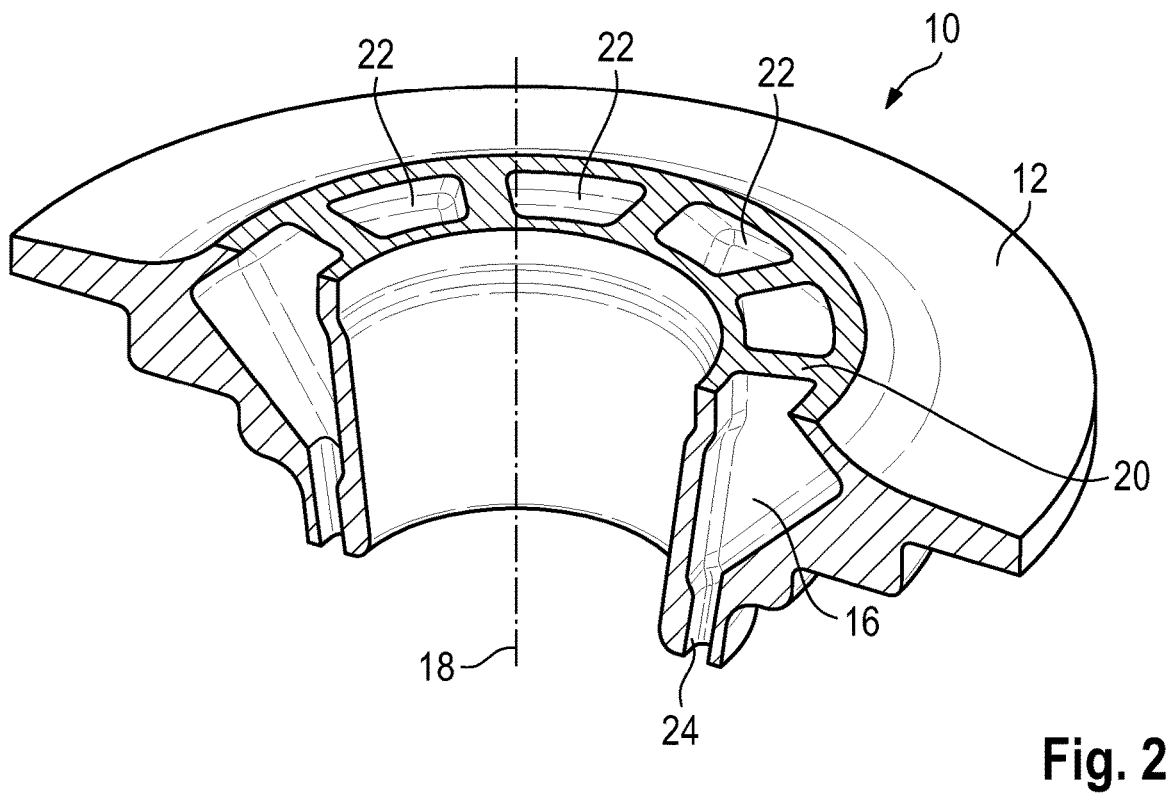
FIG. 2 is a perspective view, partly in section, of the valve spring collar of FIG. 1.

FIGS. 1 and 2 show a valve spring collar 10 according to the invention in accordance with a first, preferred embodiment.

The valve spring collar 10 comprises a plate-shaped main body 12 with a through opening 14. The valve spring collar 10 has an annular cavity 16 arranged concentrically about a center axis 18 of the main body 12. Reinforcing ribs 20 extend in the radial direction through the cavity 16. However, reinforcing elements do not necessarily have to be provided. The ribs 20 extend in a wall-like manner over an entire cross section of the cavity 16 and divide the cavity 16 into plural chambers 22.

Inlets 24 in the valve spring collar 10 connect each of the chambers 22 of the cavity 20 to an outer side of the valve spring collar 10.

The production of the valve spring collar 10 of the first embodiment will be described in the following text.

The method for producing the valve spring collar 10 comprises an additive production method. Here, the valve spring collar 10 is produced overall by way of the additive production method.

The additive production method comprises a method for production from amorphous material, for example liquids, gels/pastes, powder or the like, or neutrally shaped material, for example strip material, wire-shaped material or sheet-shaped material, by means of chemical and/or physical processes. The amorphous or neutrally shaped material is applied to produce the valve spring collar 10.

Subtractive processing optionally additionally takes place during the production of the valve spring collar 10, for example, to remove excess material during the additive production of the valve spring collar 10 and/or to carry out surface machining of the valve spring collar 10 with desired properties. Subtractive processing operations comprise material-removing methods or non-material-removing methods, such as laser machining.

Subtractive processing can take place in an alternating manner with additive processing to achieve a desired configuration of the valve spring collar 10.

The production of the valve spring collar 10 takes place by way of a hybrid machine in one work operation.

Material that accrues during the production is removed from the cavity 16 via the inlets 24.

Figure 3:
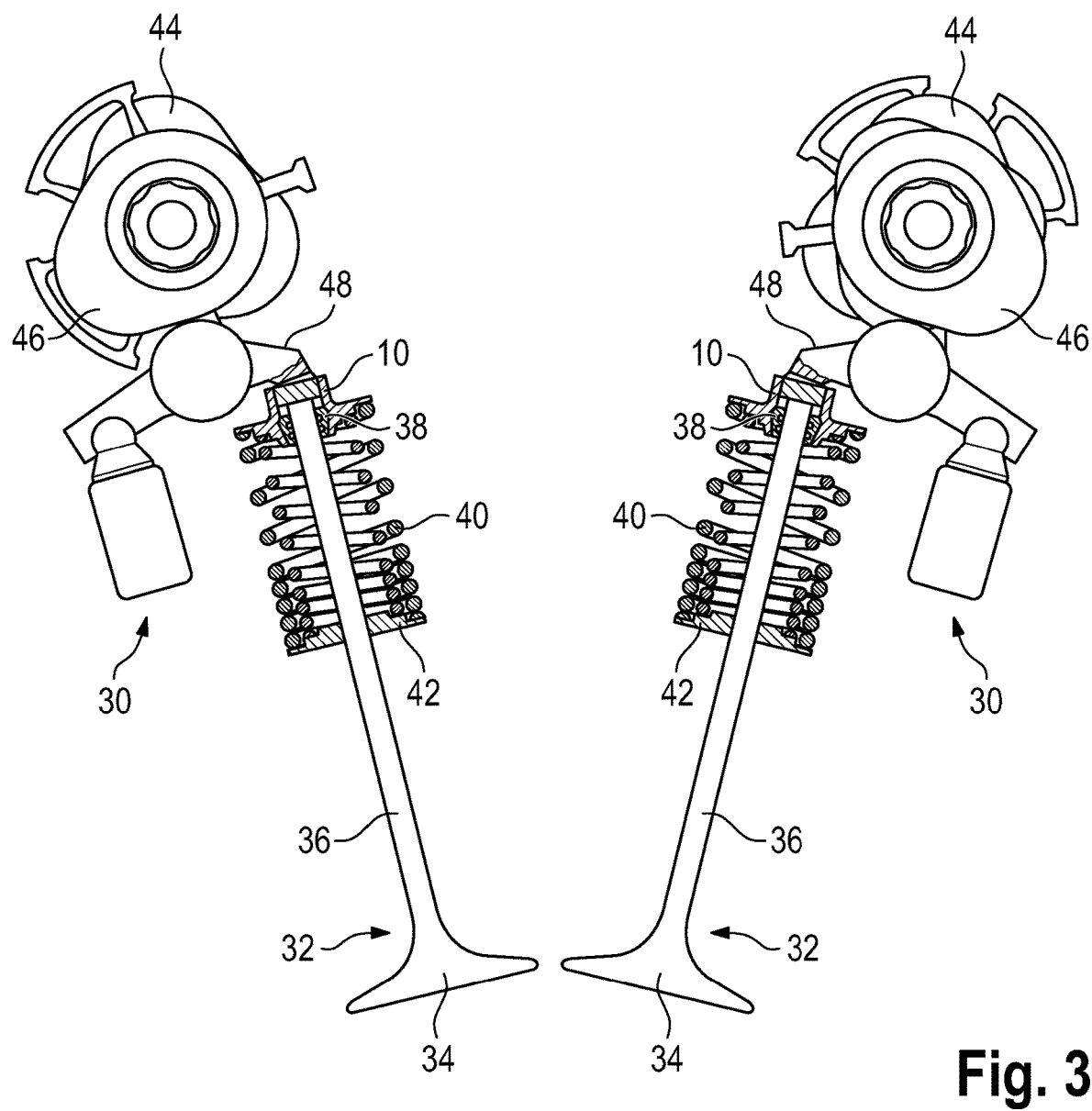
FIG. 3 is a perspective view of a valve actuation means having the valve spring collar of FIG. 1.

FIG. 3 shows a perspective illustration of a valve actuation means 30 having the valve spring collar 10 in accordance with the first embodiment. The valve actuation means 30 is configured for an internal combustion engine.

The valve actuation means 30 has a gas exchange valve 32 with a valve head 34 and a valve stem 36. Furthermore, the valve actuation means 30 comprises the above valve spring collar 10. The gas exchange valve 32 is coupled at an upper end of its valve stem 36 via a fastening means 38 to the valve spring collar 10.

Moreover, the valve actuation means 30 has a closing spring 40, which is configured as a helical spring and surrounds the valve stem 36 partially. The closing spring 40 is between the valve spring collar 10, which supplies a bearing face for the closing spring 40, and a usually fixedly positioned supporting element 42. The supporting element 42 is configured here as a lower spring collar.

The actuation of the gas exchange valves 32 of FIG. 3 takes place via a camshaft 44, the cams 46 of which press on a lever 48 which in turn presses on the valve stem 36 of the gas exchange valve 32. To this end, the lever 48 is mounted fixedly at one end. Moreover, other transmission mechanisms are also conceivable.

In one alternative embodiment, the cams 46 press directly on the valve stem 36 of the gas exchange valve 32.

The valve spring collar 10 and the valve actuation means 30 are used in the internal combustion engine to carry out a gas exchange in a combustion chamber or cylinder space of the internal combustion engine in a targeted manner. The valve actuation means 30 makes an inlet of fresh air possible, possibly together with fuel in the form of a gas/fuel mixture, and makes an outlet of combustion gases and/or residues from the combustion chamber by means of the gas exchange valves 32 possible.

What is claimed is:

1. A valve spring collar for supporting spring forces of closing springs that act on gas exchange valves in a valve actuation means of internal combustion engines, comprising:
   a tubular wall having opposite top and bottom ends and defining a through opening extending between the top and bottom ends for leading through and attaching a valve stem of the gas exchange valve;
   a main body having an outwardly extending plate-shaped portion aligned transverse to the tubular wall; and
   at least one cavity formed in the main body, the at least one cavity having a closed top and an open bottom.

2. The valve spring collar of claim 1, wherein the at least one cavity comprises plural chambers arranged annularly about a center axis of the valve spring collar.

3. The valve spring collar of claim 2, wherein the plural chambers are arranged rotationally symmetrically about a center axis of the valve spring collar.

4. The valve spring collar of claim 2, further comprising reinforcing elements extending out from the tubular wall.

5. The valve spring collar of claim 4, wherein the reinforcing elements extends through the at least one cavity.

6. The valve spring collar of claim 5, wherein the at least one reinforcing element comprises comprises plural ribs extending in radial directions through the cavity.

7. The valve spring collar of claim 1, wherein the open bottom of the at least one cavity in the valve spring collar defines at least one or more inlets, via which the cavity is connected to an outer side of the valve spring collar.

8. A valve actuation means for an internal combustion engine having the valve spring collar of claim 1.

9. An internal combustion engine for a motor vehicle having the valve actuation means of claim 8.

10. A method for producing the valve spring collar of claim 1, wherein
the method for producing the valve spring collar comprises at least one additive production step.

11. The method of claim 10, further comprising at least one subtractive processing step.

12. The valve spring collar of claim 7, wherein a radial dimension of the at least one cavity is greater at locations spaced above the at least one or more inlets than at the at least one or more inlets.

13. The valve spring collar of claim 12, wherein the plate-shaped portion of the main body is spaced from the top and bottom ends of the tubular wall.

14. The valve spring collar of claim 13, wherein a maximum radial dimension of the at least one cavity is aligned with the plate-shaped portion.

15. The valve spring collar of claim 14, wherein the main body tapers inward from the plate-shaped portion toward the opposite the top and bottom ends of the tubular wall.

16. A valve spring collar for supporting spring forces of closing springs that act on gas exchange valves in a valve actuation means of internal combustion engines, comprising:
a tubular wall having opposite top and bottom ends and defining a through opening extending between the top and bottom ends for leading through and attaching a valve stem of the gas exchange valve;
a main body having an outwardly extending plate-shaped portion aligned transverse to the tubular wall, the plate shaped portion being disposed at a location spaced from the top and bottom ends of the tubular wall; and
chambers disposed at circumferential spaced positions in the main body, the chambers being separated by reinforcing ribs projecting radially out from the tubular wall, each of the chambers having a closed top and an inlet open at a position on the main body in proximity to the bottom end of the tubular wall.

17. The valve spring collar of claim 16, wherein a radial dimension of each of the chambers is greater at locations spaced above the respective inlet than at the at respective inlet.

18. The valve spring collar of claim 16, wherein a maximum radial dimension of each of the chambers is aligned with the plate-shaped portion.

19. The valve spring collar of claim 18, wherein the main body tapers inward from the plate-shaped portion toward the opposite the top and bottom ends of the tubular wall.

\* \* \* \* \*